(12) United States Patent
Ho

(10) Patent No.: US 6,510,501 B1
(45) Date of Patent: Jan. 21, 2003

(54) NON-VOLATILE MEMORY READ/WRITE SECURITY PROTECTION FEATURE SELECTION THROUGH NON-VOLATILE MEMORY BITS

(75) Inventor: Franklin Sai-Wai Ho, San Carlos, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/309,342

(22) Filed: May 11, 1999

(51) Int. Cl.[7] .............................................. G06F 12/14
(52) U.S. Cl. ........................ 711/163; 711/164; 711/166
(58) Field of Search ................................. 711/103, 163, 711/164, 166, 156; 713/1, 200

(56) References Cited

U.S. PATENT DOCUMENTS

| | | | |
|---|---|---|---|
| 4,998,203 A | 3/1991 | DiGulio | 705/405 |
| 5,442,704 A | 8/1995 | Holtey | 711/163 |
| 5,465,349 A | 11/1995 | Geronimi et al. | 714/30 |
| 5,481,610 A | 1/1996 | Doiron et al. | 380/270 |
| 5,491,827 A | 2/1996 | Hotley | 711/163 |
| 5,557,743 A | * 9/1996 | Pombo et al. | 713/200 |
| 5,600,818 A | * 2/1997 | Weikmann | 711/163 |
| 5,604,713 A | 2/1997 | Short et al. | 365/230.06 |
| 5,677,891 A | 10/1997 | Short et al. | 365/230.06 |
| 5,930,826 A | * 7/1999 | Lee et al. | 711/163 |
| 5,963,980 A | * 10/1999 | Coulier et al. | 711/163 |
| 6,032,237 A | * 2/2000 | Inoue et al. | 711/163 |
| 6,148,384 A | * 11/2000 | Devanagundy et al. | 711/163 |
| 6,154,819 A | * 11/2000 | Larsen et al. | 711/163 |

OTHER PUBLICATIONS http://www.pcguide.com/ref, "The BIOS and the Software Layer Model", "Hard Disk BIOS and Capacity Factors", "Role of the BIOS in Hard Disk Access", "The Int13h Interface", "Two and Four Disk BIOS IDE Support".*

* cited by examiner

Primary Examiner—Gary J Portka
(74) Attorney, Agent, or Firm—Stallman & Pollock LLP

(57) ABSTRACT

A memory system in accordance with the invention includes a programmable non-volatile memory that contains a security indication and program instructions. A volatile register is also provided. Memory interface logic circuitry operates responsive to the contents of the volatile register, to selectively allow access to the memory. Security indication copying circuitry receives a reset signal for the memory system. In response to the reset signal, the copying circuitry causes the security indication to be copied into the volatile register as the contents thereof.

8 Claims, 2 Drawing Sheets

NON-VOLATILE MEMORY READ/WRITE SECURITY PROTECTION FEATURE SELECTION THROUGH NON-VOLATILE MEMORY BITS

TECHNICAL FIELD

The present invention relates to security for programmable non-volatile memories (PNVM) and, in particular, to such a memory and associated circuitry equipped to handle and act upon, in a secure manner, a security status data stored within the memory itself.

BACKGROUND

Programmable non-volatile memories (e.g. electrically erasable programmable read-only memory and flash memory circuits) are well-known. In some applications, such as in control of safety functions in automobiles, security circuitry for read/write protection of the contents of PNVM circuits is commonly used. In this way, end-consumers are prevented from altering the contents of these memories and causing potentially life-threatening conditions. For example, security circuitry would commonly be used to protect the contents of an PNVM containing a program to control a vehicle's anti-lock brake system.

Conventionally, such security circuitry includes non-volatile security register circuitry, separate from the PNVM memory array itself, and the contents of which determine the security status of the PNVM contents. A major disadvantage of using non-volatile register circuitry for security functions is that it uses a large amount of chip area, and also that it requires special complex circuitry apart from the memory circuitry itself.

SUMMARY

A memory system in accordance with the invention includes a non-volatile memory to contain a security indication and program instructions. A volatile register is also provided.

Memory interface logic circuitry operates responsive to the contents of the volatile register, to selectively allow access to the memory. Security indication copying circuitry receives a reset signal for the memory system. In response to the reset signal, the copying circuitry causes the security indication to be copied into the volatile register as the contents thereof.

DETAILED DESCRIPTION

In accordance with the invention, a memory is provided having a plurality of addressable memory locations, one of which addressable for holding security data for the memory. The security of the memory depends on the security data. In particular, associated interface circuitry controls access to the memory based upon the security data.

Figure 1:
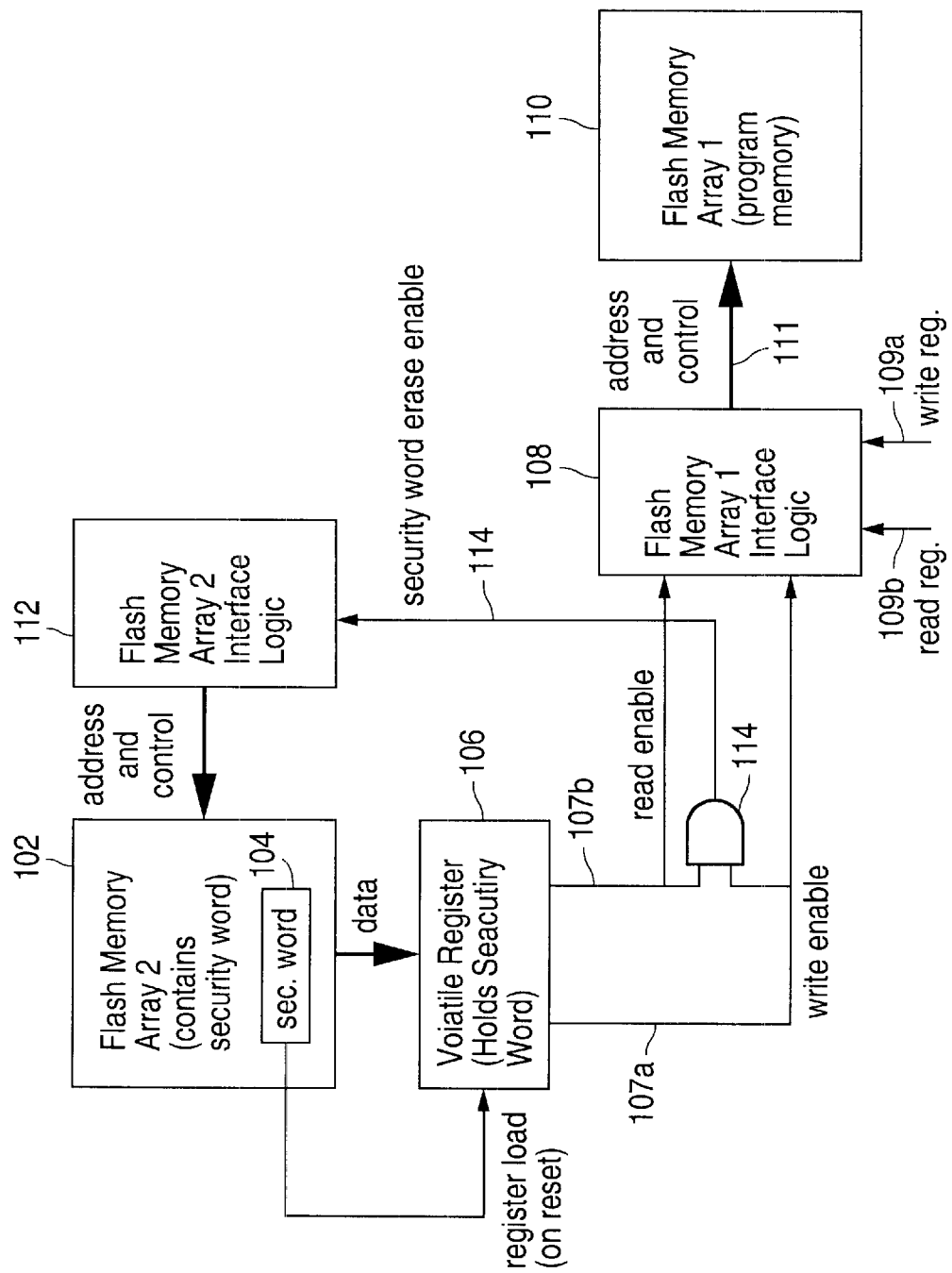
FIG. 1 illustrates an embodiment of the invention in block form.

A particular embodiment in accordance with the invention is disclosed in FIG. 1. As shown in FIG. 1, a flash memory array 102 includes a security "word" location 104. (As used herein, "word" is not meant to imply any particular bit-length of the security data or of the location in which it is stored.) As will be seen in greater detail later with reference to the timing diagram of FIG. 2, upon reset but before any other memory fetch is allowed, the contents of the security word location 104 is provided from the memory 102 into a volatile register 106 external to the memory array 102. Because the register 102 is volatile, it does not require the complex circuitry of the conventional non-volatile security register circuitry. Based on the security word in the volatile register, "write enable" 107a and "read enable" 107b signals are generated.

Flash memory array interface logic 108 includes within it combining circuitry (e.g., AND logic) to combine the "write enable" 107a and "read enable" 107b signals with memory write request 109a and read request 109b signals, respectively, to generate appropriate memory control signals 111 for accessing the flash memory array 110. While the FIG. 1 embodiment shows the memory system having a flash memory array 102 that includes the security word 104 and another flash memory array 110 that includes program instructions, it is within the scope of the invention for the security word and the memory to be secured to be within a single memory array.

The security word location 104 itself is protected from being erased if any of the security features are enabled, as indicated by the content of the security word in the security word location 104. That is, as discussed above, the contents of the security word location 104 are latched into the volatile register 106 upon reset and before any other memory fetch is allowed. As shown schematically in FIG. 1, AND circuitry combines the write enable 107a and read enable 107b signals together to generate a security word erase enable signal 114. Thus, it can be seen that only if the security word in the volatile register 106 indicates both write enable and read enable can the security word in the security word location 104 of the flash memory array 102 be erased.

Figure 2:
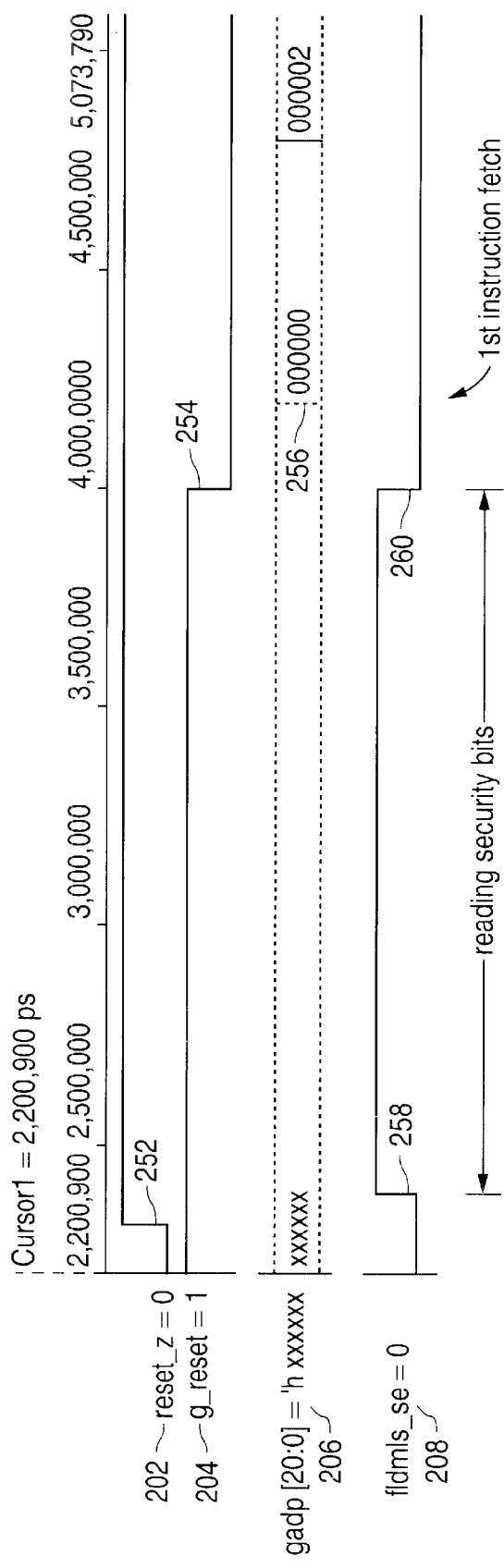
FIG. 2 is a timing diagram that illustrates the operation of the FIG. 1 system.

The operation of the FIG. 1 circuit is now explained in greater detail with reference to the FIG. 2 timing diagram. In FIG. 2, the reset_z signal 202 is the active low external reset input. The g_reset signal is the active high internal reset input going to all blocks. The gadp[20:0] signal 206 is the instruction fetch address. The fldmls_se signal 208, when active, enables the sense amplifier of the memory array containing the security bits to transfer the security bits to the volatile register 106.

Now, turning to FIG. 2, at point 252 the external reset signal goes inactive, signalling that the circuit is to go out of reset. At point 254, some time later, the g_reset signal 204 goes inactive, bringing the blocks of the circuit 100 out of reset. What happens between point 252 and point 254 is significant.

In particular, the gadp[20:0] signal is the instruction fetch address. At point 256, the first address is ready for the instruction to be fetched. Notably, point 256 is after point 254. That is, in the interim between points 252 and 254, the security bits are being read from the security word 104 of the memory 102 into the volatile register 106. The fldmls_se signal 208 enables the sense amplifier of the memory 102 holding the security word 104. The high period (between 258 and 260) is the period during which the security word 104 is being read out of the memory 102.

There are some test modes available on the chip to test its functionality. One is to supply instructions from an external source rather than executing instructions stored in the program memory array so that any instruction sequence can be executed, not limited to what is in the memory array.

Another is to allow direct access to the non-volatile memory array (i.e. provide address inputs, read/write control signals and data I/O port on various device pins) to treat it like a standard memory. This allows one to isolate and interface directly to the memory array and make memory testing much easier and faster, as the memory array does not have to be accessed through read/write operations by the CPU. Test mode is usually entered through a set of input pins being in a certain state.

The problem is that if this test mode is entered this way, and the memory test mode allows direct access to the memory, the security feature would be bypassed as the memory is controlled from external pins, and therefore the internal logic is not able to load the security word into the volatile register. Therefore, the test mode logic is made so that this memory test mode is not entered until after reset, i.e. after the security word has been loaded into the volatile latch); thereafter, the security feature has been set up properly and then all accesses to the memory in this test mode are made subject to the security status.

It should be noted that, in general, the memory being protected includes program instructions. However, the memory could also include constant data, such as a look-up table. In one embodiment, the write protection prevents any further write to the memory. As for read protection, in one embodiment, the read protection only prevents reading of the memory in certain modes like test mode, but it does not prevent the CPU from reading the memory and executing the instructions (as it would not be particularly meaningful or useful to prevent the CPU from reading the memory to execute instructions).

It should also be noted that, also for security reasons, even though reading a piece of data out of the memory array, including the security word, requires only one cycle, the (security word read) is made to be multiple cycles long (longer than the number of cycles for a normal read access) to ensure the security word is read out properly. In one embodiment, 32 cycles was used, but only because that signal already existed in the chip for another purpose. This prevents someone from defeating the read by reading the security word out with a clock that is out of specification (e.g., with a faster than expected clock).

What is claimed is:

1. A memory system, comprising:
   a programmable non-volatile memory to contain a security indication and program instructions;
   a register;
   memory interface logic circuitry responsive to the contents of the register to selectively allow access by a processor to the memory;
   security indication copying circuitry that receives a reset signal for the memory system and, in response to the reset signal, causes the security indication to be copied into the register as the contents thereof, and wherein the security indication includes a first indication for security of write access to the memory and a second indication for security of read access to the memory, and wherein the first indication and the second indication are independently controllable, and
   wherein the memory interface logic circuitry allows erase access to the security indication in the memory only if the first indication ad the second indication are such that both write access and read access to the memory are enabled.

2. A method of providing a secured memory system, comprising:
   providing a programmable non-volatile memory that contains a security indication and program instructions;
   providing a register;
   responding to the contents of the register to selectively control access by a processor to the memory;
   receiving a reset signal for the memory system and, in response to the reset sign, causing the security indication to be copied into the register as the contents thereof;
   controlling write and/or erase access to a location in the memory that contains the security indication itself during the access controlling step;
   and wherein the security indication includes a first indication for security for write access to the memory and a second indication for security of read access to the memory, and wherein the first indication and the second indication are independently controllable;
   and further comprising allowing erase access to the security indication in the memory only if the first indication and the second indication are such at both write access and read access to the memory are enabled.

3. A memory security system comprising:
   a first non-volatile memory that includes a security location that stores security data;
   a volatile storage register connected to receive the security data from the security location at the non-volatile memory upon receipt of a reset signal by the non-volatile memory, the volatile storage register generating a write enable signal and a read enable signal based upon the security data;
   a first interface logic circuit that logically combines the write enable signal and the read enable signal and a memory write request signal and a memory read request signal to provide a memory control signal;
   a second non-volatile memory, access to the second non-volatile memory being controlled by the memory control signal;
   AND circuitry that combines the write enable signal and the read enable signal to generate a security data erase enable signal; and
   a second interface logic circuit that responds to the security data erase enable signal to provide an erase control signal to the first non-volatile memory such that the security location in the first non-volatile memory can be erased only if the security data stored in the volatile storage register indicates both write enable and read enable.

4. A memory system as in claim 3, and further comprising:
   a processor connected to the memory system via a first interface;
   an external circuit connected to the memory system via a second interface; and
   wherein the memory system is operable in a special mode that allows direct access to the memory system by the external circuit; and
   wherein the special mode can be entered only after the security data is received by the volatile storage register such that security features of the memory system are set up before the special mode is entered.

5. A memory system as in claim 3, and wherein the first and second non-volatile memories are included in a single memory array.

6. A method of providing a secure memory system, the method comprising:

storing security data in a security location of a first non-volatile memory;

transferring the security data from the security location of the non-volatile memory to a volatile storage register upon receipt of a reset signal by the non-volatile memory;

generating a write enable signal and a read enable signal based upon the security data stored in the volatile storage register;

logically combining the write enable signal and the read enable signal and memory write request and memory read request signals to provide a memory control signal;

controlling access to a second non-volatile memory based upon the memory control signal;

logically combining the write enable signal and the read enable signal to generate a security data erase enable signal; and providing a second interface logic circuit that responds to the security data erase enable signal to provide an erase control signal to the first non-volatile memory such that the security location in the first non-volatile memory can be erased only if the security data stored in the volatile storage register indicates both write enable and read enable.

7. A method as in claim 6, and further comprising:

providing a processor connected to the second non-volatile memory via a first interface;

providing an external circuit connected to the second non-volatile memory via a second interface; and operating the second non-volatile memory in a special mode that allows direct access to the memory system by the external circuit; and entering the special mode only after the security data is received by the volatile storage register such that security features of the second non-volatile memory are set up before the special mode is entered.

8. A method as in claim 6, and wherein the first and second non-volatile memories are included in the single memory array.

* * * * *

UNITED STATES PATENT AND TRADEMARK OFFICE
CERTIFICATE OF CORRECTION

PATENT NO.      : 6,510,501 B1
DATED           : January 21, 2003
INVENTOR(S)     : Franklin Sai-Wai Ho It is certified that error appears in the above-identified patent and that said Letters Patent is hereby corrected as shown below:

Column 4,
Line 7, change "sign" to -- signal --.

Signed and Sealed this

Twelfth Day of August, 2003

JAMES E. ROGAN
*Director of the United States Patent and Trademark Office*